United States Patent [19]

Koch et al.

[11] Patent Number: 5,145,894
[45] Date of Patent: Sep. 8, 1992

[54] STABILIZED POLYARYL ETHER KETONE MOLDING COMPOSITIONS CONTAINING A PHOSPHORUS COMPOUND

[76] Inventors: Juergen Koch, 5 Mainstrasse, 6708 Neuhofen; Gregor Schuermann, 40 Werderstrasse, 6900 Heidelberg; Gerhard Heinz, 2 Im Vogelsang, 6719 Weisenheim, all of Fed. Rep. of Germany

[21] Appl. No.: 726,405

[22] Filed: Jul. 10, 1991

[30] Foreign Application Priority Data

Jul. 12, 1990 [DE] Fed. Rep. of Germany ....... 4022213
Jul. 12, 1990 [DE] Fed. Rep. of Germany ....... 4022214

[51] Int. Cl.$^5$ .......................... C08K 5/52; C08K 5/53
[52] U.S. Cl. ..................... 524/129; 524/139; 524/141; 524/148; 524/g310203
[58] Field of Search .............. 524/139, 141, 148, 150, 524/151, 129

[56] References Cited

U.S. PATENT DOCUMENTS 5,063,265  11/1991  Harris ................................ 524/151

FOREIGN PATENT DOCUMENTS 0308803  3/1989  European Pat. Off. .
1446962  8/1976  United Kingdom .

*Primary Examiner*—Paul R. Michl
*Assistant Examiner*—Tae H. Yoon
*Attorney, Agent, or Firm*—Keil & Weinkauf

[57] ABSTRACT

A stabilized polyaryl ether ketone molding composition contains as essential components A: from 50 to 99.99% by weight of a polyaryl ether ketone A prepared by electrophilic polycondensation and at least 50 mol % of which is made up of units of the general formula I $$-O-\phi-T \cdot (\phi)_s-O-\phi-\overset{O}{\underset{\|}{C}}-\phi-T' \cdot (\phi)_t- \quad \text{I}$$

where s and t are each 0, 1, 2, or 3 and T and T' are each —O— or —CO—, or a ring-substituted $C_1$-$C_8$-alkyl, $c_6$-$C_{20}$-arly or halogen derivative thereof, B: from 0.01 to 4% by weight of a phosphorus compound B containing units of the general formula IIa $$\underset{\underset{\underset{Q^1}{|}}{\overset{(O)_w}{|}}}{\overset{(V)_v}{\overset{\|}{-P}}}-(O)_u-Ar^1-(O)_u-, \quad \text{(IIa)}$$

or of the general formula IIb $$Q^3-\underset{\underset{Q^2}{|}}{\overset{O}{\overset{\|}{P}}}(O)_u Ar^2\big)_x X-Ar\big)_x(O)_u \underset{\underset{Q^2}{|}}{\overset{O}{\overset{\|}{P}}}-Q^3, \quad \text{(IIb)}$$

in which the substituents and indices have the following meanings:

V is oxygen or sulfur, $Q^1$ is $C_1$-$C_{25}$-alkyl or aryl or from 6 to 25 carbon atoms in which the aromatic rings can be monosubstituted, disubstituted or trisubstituted by slkyl of from 1 to 4 carbon atoms, $Q^2$ and $Q^3$ are each independently of the other $C_1$-$C_{20}$-alkyl, $C_1$-$C_{20}$-alkoxy or aryl or aryloxy of from 6 to 20 carbon atoms, it being possible for the aforementioned hydrocarbon radicals to be interrupted by from 1 to 3 heteroatoms such as nitrogen, oxygen or sulfur, $Ar^1$ is meta-phenylene, para-phenylene or from 2 to 6 aromatic rings which are linked together meta or para via a chemical bond or via oxygen, sulfur, a —CO— group, an —SO$_2$— group or a —C(CH$_3$)$_2$— group, it being possible for each aromatic ring to be monosubstituted, disubstituted or trisubstituted by alkyl of from 1 to 4 carbon atoms, $Ar^2$ is meta- or para-phenylene which may be monosubstituted, disubstituted or trisubstituted by $C_1$-$C_{10}$-alkyl, $C_1$-$C_{10}$-alkoxy, $C_6$-$C_{20}$-aryl, $C_6$-$C_{20}$-aryl, $C_6$-$C_{20}$-aryloxy or halogen, X is —O—, —CO—, —S—, an —SO$_2$— group, a —C(CH$_3$)$_2$— group or a chemical bond, u, v, and w are each 0 or 1, and x is 0, 1 or 2, C: up to 50% by weight of a further thermoplastic which differs form A), D: up to 45% by weight of fibrous or particulate fillers or mixtures thereof.

4 Claims, No Drawings

STABILIZED POLYARYL ETHER KETONE MOLDING COMPOSITIONS CONTAINING A PHOSPHORUS COMPOUND

Polyaryl ether ketone compositions are high-grade thermoplastics which are notable for particularly high heat resistance, high toughness, very good mechanical properties and resistance to common solvents.

Polyaryl ether ketones can be prepared by two different, conventional methods. In the so-called nucleophilic polycondensation method the oxygen bridge is formed by reacting for example aromatic dihydroxy compounds with difluoroketones under base catalysis. Such a method is described for example in EP-A-1879.

A second way of preparing polyaryl ether ketones is electrophilic (Friedel-Crafts) polycondensation. In this case the carbonyl bridge is formed either by reacting aromatic dicarbonyl dichlorides or phosgene with aromatics which contain two hydrogen atoms which are replaceable by electrophilic substitution, or by polycondensing an aromatic carbonyl chloride containing not only an acid chloride group but also a replaceable hydrogen atom with itself.

Friedel-Crafts reactions are customarily carried out in the presence of a Lewis acid as catalyst in solutions, as described for example in U.S. Pat. Nos. 3,441,538, 3,442,857, and 3,953,400, DE-A-3,241,444, DE-A-34 16 445 and DE-A34 16 446. The reaction in the presence of a Lewis base is likewise possible and described for example in EP-A-124 276.

The polyether ketones prepared by electrophilic polycondensation can be substantially freed from the acids by extraction with a suitable solvent, but traces of acid will remain behind in the polymer.

The thermoplastic processing of polyaryl ether ketone molding compositions involves temperatures of 400° C., briefly even around 450° C., being reached in the melt. At these very high temperatures the melt viscosity increases and the molding compositions become increasingly discolored. This behavior can significantly impede processing and impair the performance characteristics of the molded parts.

To reduce the viscosity increase and the discoloration GB-A-1 446 962 describes the use of monocyclic phosphorus compounds. DE-A-34 19 976 proposes adding compounds of trivalent phosphorus to the polymer. The use of phosphorus compounds to improve the stability at high temperatures is also described in EP-A-308 803. However, owing to their high vapor pressure these compounds all escape from the melt at the processing temperature customary for polyaryl ether ketones, which can lead to odor nuisance and, in the case of injection molding, to coatings forming on the mold surface.

It is an object of the present invention to make available polyaryl ether ketone molding compositions which do not have the above-described disadvantages.

We have found that this object is achieved by a stabilized polyaryl ether ketone molding composition, containing as essential constituents A: from 50 to 99.99% by weight of a polyaryl ether ketone A prepared by electrophilic polycondensation and at least 50 mol % of which is made up of units of the general formula I

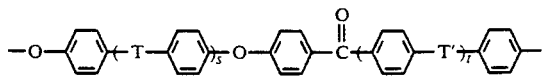

where s and t are each 0, 1, 2 or 3 and T and T' are each —O— or —CO—, or a ring-substituted $C_2$-$C_8$-alkyl, $C_6$-$C_{20}$-aryl or halogen derivative thereof, B: from 0.01 to 4% by weight of a phosphorus compound B containing units of the general formula IIa

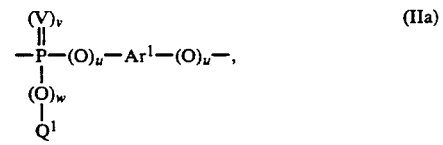

or of the general formula IIb

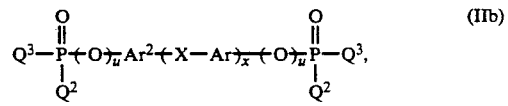

in which the substituents and indices have the following meanings

V is oxygen or sulfur, $Q^1$ is $C_1$-$C_{25}$-alkyl or aryl of from 6 to 25 carbon atoms in which the aromatic rings can be monosubstituted, disubstituted or trisubstituted by alkyl of from 1 to 4 carbon atoms, $Q^2$ and $Q^3$ are each independently of the other $C_1$-$C_{20}$-alkyl, $C_1$-$C_{20}$-alkoxy or aryl or aryloxy of from 6 to 20 carbon atoms, it being possible for the aforementioned hydrocarbon radicals to be interrupted by from 1 to 3 heteroatoms such as nitrogen, oxygen or sulfur, $Ar^1$ is meta-phenylene, para-phenylene or from 2 to 6 aromatic rings which are linked together meta or para via a chemical bond or via oxygen, sulfur, a —CO— group, an —$SO_2$— group or a —$C(CH_3)_2$— group, it being possible for each aromatic ring to be monosubstituted, disubstituted or trisubstituted by alkyl of from 1 to 4 carbon atoms, $Ar^2$ is meta- or para-phenylene which may be monosubstituted, disubstituted or trisubstituted by $C_1$-$C_{10}$-alkyl, $C_1$-$C_{10}$-alkoxy, $C_6$-$C_{20}$-aryl, $C_6$-$C_{20}$-aryloxy or halogen, X is —O—, —CO—, —S—, an —$SO_2$— group, a —$C(CH_3)_2$— group or a chemical bond, u,v, and w are each 0 or 1, and x is 0, 1 or 2, C: up to 50% by weight of a further thermoplastic which differs from A), D: up to 45% by weight of fibrous or particulate fillers or mixtures thereof.

The component A) polyaryl ketones consist of at least 50 mol % of units of the general formula I

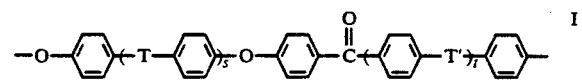

where s and t are each 0, 1, 2 or 3 and T and T' are each oxygen or carbonyl. In principle, the aromatic units of the polyaryl ether ketones I can be substituted by $C_1$-$C_8$-alkyl, $C_6$-$C_{20}$-aryl or halogen. In general, however, the unsubstituted derivatives are preferred. Examples of particularly preferred units of the general formula I are:

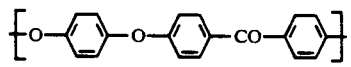   Ia

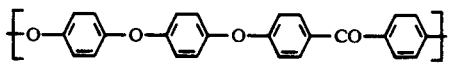   Ib

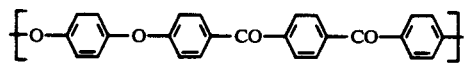   Ic

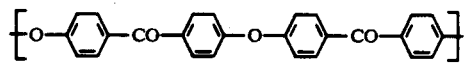   Id and in particular

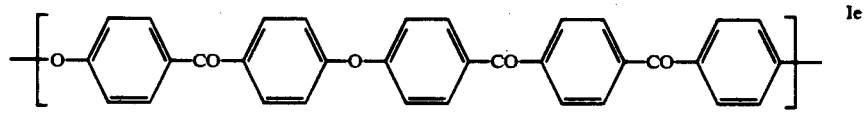   Ie

In terms of the substituents T and T' and the parameters s and t the foregoing examples can be described as follows:

|    | s | t | T  | T' |
|----|---|---|----|----|
| Ia | 0 | 0 | —  | —  |
| Ib | 1 | 0 | O  | —  |
| Ic | 0 | 1 | —  | CO |
| Id | 1 | 0 | CO | —  |
| Ie | 1 | 1 | CO | CO |

Component A is used in amounts of from 50 to 99.99% by weight, based on the total weight of the molding compositions, preferably from 60 to 99.99% by weight, in particular from 70 to 99.99% by weight.

The polyaryl ether ketones are prepared by electrophilic polycondensation; the usual conditions known to those skilled in the art are employed. If the starting materials are aromatic dicarbonyl dichlorides and aromatics which have two replaceable hydrogen atoms, suitable examples are terephthaloyl dichloride or 4,4'-biphenyldicarbonyl dichloride and also diphenyl ether, 1,4-diphenoxybenzene or 4,4'-diphenoxybenzophenone. A suitable self-condensable monomer is 4-phenoxybenzoyl chloride.

The component B polymeric phosphorus compounds contain units either of the general formula IIa

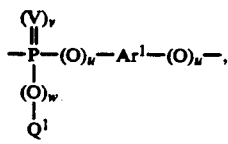   IIa or of the general formula IIb (cf. hereinafter), where V is oxygen or sulfur, $Q^1$ is $C_1$–$C_{25}$-alkyl, preferably $C_1$–$C_{20}$-alkyl, or aryl of from 6 to 25 carbon atoms, preferably phenyl, it being possible for the aromatic rings to be monosubstituted, disubstituted, trisubstituted, preferably monosubstituted or disubstituted, by alkyl of from 1 to 4 carbon atoms, preferably tert-butyl. The substituent $Ar^1$ is a divalent, substituted or unsubstituted aromatic radical which contains from 1 to 6 aromatic rings linked together meta or para via a chemical bond or via oxygen, sulfur, a —CO— group, an —SO$_2$— group or a —C(CH$_3$)$_2$— group. Preference is given to units of the general formula IIa where $Ar^1$ is unsubstituted or methyldisubstituted para-phenylene or from two to four unsubstituted aromatic rings preferably linked together para. Two rings are best linked together via a chemical bond or via a —CO— group, an —SO$_2$— group or a —C(CH$_3$)$_2$— group; in the case of compounds composed of three rings it is particularly preferable for each of the two linkages to be formed by a —C(CH$_3$)$_2$— group; and in the case of compounds composed of 4 aromatic rings preference is given to those which have a symmetrical structure where each of the aromatic rings making up the preferred two-ring compounds has attached to it an —O—C$_6$H$_4$— group in para-position. The indices u, v and w of the formula IIa can each be 0 or 1.

Examples of particularly preferred units of the general formula IIa are:

|                       | u | v | w | v |
|-----------------------|---|---|---|---|
| phosphines            | 0 | 0 | 0 | — |
| phosphine oxides      | 0 | 1 | 0 | 0 |
| phosphonous esters    | 1 | 0 | 0 | — |
| phosphonic esters     | 1 | 1 | 0 | 0 |
| phosphorous esters    | 1 | 0 | 1 | — |
| phosphoric esters     | 1 | 1 | 0 | 0 |
| thiophosphoric esters | 1 | 1 | 1 | S |

Of particular interest are the following units:

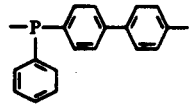   IIa, 1

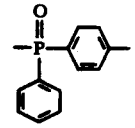   IIa, 2

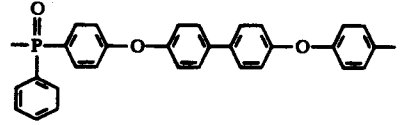   IIa, 3

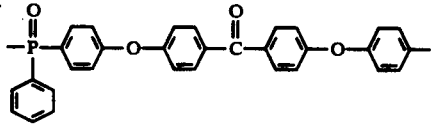   IIa, 4

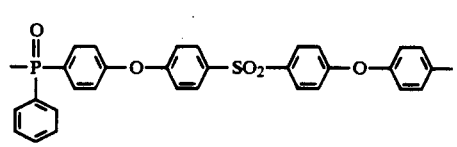   IIa, 5

-continued

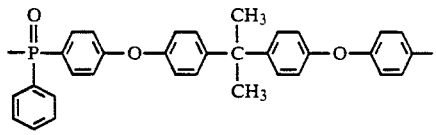
IIa, 6

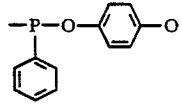
IIa, 7

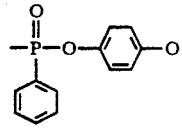
IIa, 8

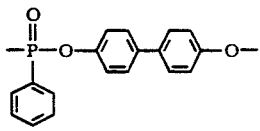
IIa, 9

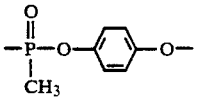
IIa, 10

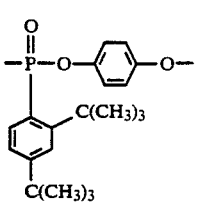
IIa, 11

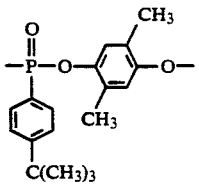
IIa, 12

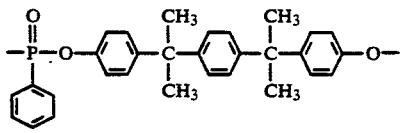
IIa, 13

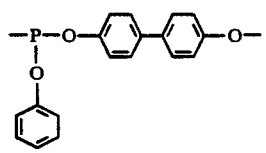
IIa, 14

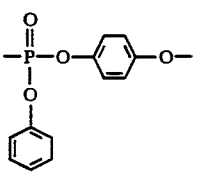
IIa, 15

-continued

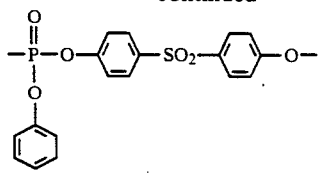
IIa, 16

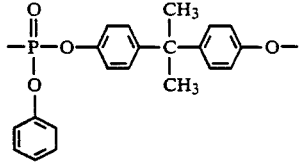
IIa, 17

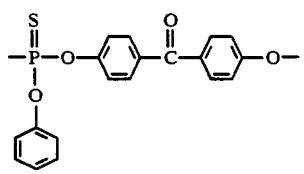
IIa, 18

Component IIa has an inherent viscosity of greater than 0.1, preferably from 0.2 to 0.8 (measured on a solution of 1 g/100 ml in N-methylpyrrolidone at 25° C.).

As component B it is also possible to use bicyclic phosphorus compounds of the general formula IIb

IIb where $Q^2$ and $Q^3$ are each $C_1$–$C_{20}$-alkyl, $C_1$–$C_{20}$-alkoxy, $C_6$–$C_{20}$-aryl or $C_6$–$C_{20}$-aryloxy, it being possible for the hydrocarbon radicals to be interrupted by from 1 to 3 heteroatoms such as nitrogen, oxygen or sulfur. Preference is given to those compounds where $Q^2$ and $Q^3$ are identical. If $Q^2$ and $Q^3$ are each alkyl or alkoxy, preference is given to the $C_3$–$C_{12}$-compounds. Preferred aryl is phenyl, preferred aryloxy is phenoxy. If the hydrocarbon radicals contain heteroatoms, then anisyl, pyridinyl and thienyl are suitable.

The substituent $Ar^2$ is meta- or para-phenylene which in turn may be monosubstituted, disubstituted or trisubstituted by alkyl or alkoxy of from 1 to 10 carbon atoms, aryl or aryloxy of from 6 to 20 carbon atoms or halogen. Preference is given to the unsubstituted radicals, in particular para-phenylene.

X is oxygen, sulfur, carbonyl, —$SO_2$—, —$C(CH_3)_2$— or a chemical bond, preferably —$SO_2$—, carbonyl or a chemical bond.

Of the indices, u can be 0 or 1, the latter being preferred, and x is 0, 1 or 2, preferably 0 or 1.

Examples of particularly preferred bicyclic phosphorus compounds of the general formula IIb are:

IIb, 1

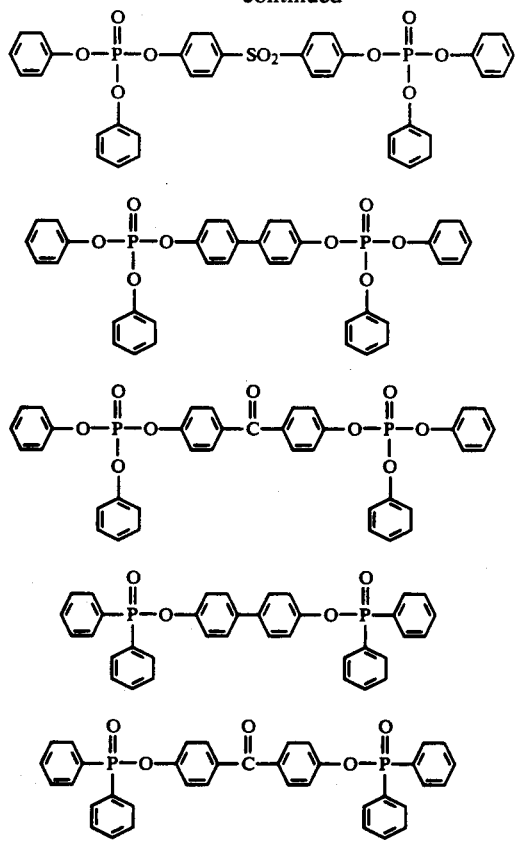

In terms of the substitutents $Q^2$, $Q^3$, $Ar^1$ and X and the parameters u and x the foregoing examples can be described as follows:

| | $Q^2, Q^3$ | Ar | X | u | x |
|---|---|---|---|---|---|
| IIa | —O—$C_6H_5$ | p-$C_6H_4$ | — | 1 | 0 |
| IIb | —O—$C_6H_5$ | p-$C_6H_4$ | $SO_2$ | 1 | 1 |
| IIc | —O—$C_6H_5$ | p-$C_6H_4$ | chem. bond | 1 | 1 |
| IId | —O—$C_6H_5$ | p-$C_6H_4$ | CO | 1 | 1 |
| IIe | —$C_6H_5$ | p-$C_6H_4$ | chem. bond | 1 | 1 |
| IIf | —$C_6H_5$ | p-$C_6H_4$ | CO | 1 | 1 |

The amounts in which component B is used range from 0.01 to 4% by weight, preferably from 0.1 to 1% by weight, based on the total weight of the molding compositions.

The preparation of suitable polymeric phosphorus compounds IIa is described for example in U.S. Pat. No. 3,993,623 and DE-A-29 25 206, and also in K. S. Annakutty, K. Kishore, Polymer 29 (1988), 756–761, K. Kishore, K. S. Annakutty, I. M. Mallick, Polymer 29 (1988), 762–764, and H. Kricheldorf, H. Koziel, New Polymeric Materials 1 (1988), 143–153. General methods of preparation are known from Houben-Weyl, Methoden der organischen Chemie, Phosphorverbindungen, 1963.

The bicyclic phosphorus compounds IIb can be prepared by reacting an acid chloride of the corresponding phosphorus compound with dihydroxyphenylene compounds with removal of the resulting hydrogen chloride, as described in Houben-Weyl, Methoden der organischen Chemie, Phosphorverbindungen, part 1, 1963.

In addition, further thermoplastics C different from component A can be mixed in. Suitable for this purpose are in particular polyaryl ether sulfones or copolymers thereof, polyether imides, polyamide imides, polyimides, aromatic polyesters, polyphenylene sulfides, fluoropolymers and aliphatic or aromatic polyamides.

Appropriate products are known to those skilled in the art and are commercially available.

These polymers can be added in amounts of from 0 to 50% by weight, preferably from 5 to 30% by weight.

The stabilized polyaryl ether ketone molding compositions of the present invention may further contain as component D fibrous or particulate fillers and also mixtures thereof in amounts of from 0 to 45% by weight, in particular from 5 to 40% by weight. As reinforcing fillers there may be mentioned for example asbestos or fibers made of aramid, glass or carbon, which can be used not only in the form of chopped fiber but also in the form of continuous filaments. It is also possible to include pigments such as titanium dioxide, cadmium sulfide, zinc sulfide, barium sulfate and carbon black. As further additive and auxiliary substances it is possible to use for example flameproofing agents, further stabilizers other than B), and customary processing aids.

To produce the stabilized polyaryl ether ketone molding compositions of the present invention, the components A and B and as appropriate C and D can be reacted in a mixing apparatus, preferably in an extruder, at a housing temperature of from 350° to 450° C., preferably from 390° to 420° C. In a preferred embodiment, the mixture is extruded in strand form and granulated.

The stabilized polyaryl ether ketone molding compositions of the present invention are lighter colored and exhibit significantly better flowability and melt stability than nonstabilized molding compositions; nor was there any sign of outgasing from the melt. The stabilized polyaryl ether ketone molding compositions are therefore suitable in particular for producing fibers, films and moldings.

EXAMPLES

Preparation of Polyaryl Ether Ketone

The method described in Example 13 of EP-A-124 276 was used to prepare a polyaryl ether ketone of structure Ie

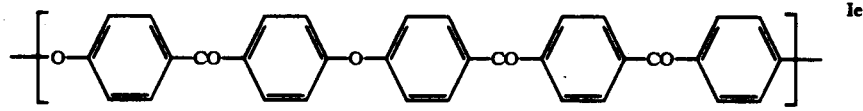

having an inherent viscosity of 0.997 (measured at 0.5 g/100 ml in concentrated sulfuric acid at 25° C.).

Preparation of polymeric phosphorus compounds IIa

Preparation of phosphine oxide of the formula IIa, 6

51.941 g (0.15 mol) of 4,4'-bis(fluoro)triphenylphosphine oxide, 34.244 g (0.15 mol) of bisphenol A and 22.805 g (0.165 mol) of potassium carbonate were admixed with 200 ml of N-methylpyrrolidone, and the mixture was stirred under reflux at 200° C. for 7 hours. After cooling down, the polymeric reaction product was precipitated by dropwise addition to water, separated off by filtration and repeatedly extracted with boiling water. Drying gave a polymer of the formula IIa, 6 having an inherent viscosity of 0.14 (measured on 1 g/100 ml of N-methylpyrrolidone at 25° C.).

Preparation of a Phosphine Oxide of the Formula IIa, 3

The conditions described in Example 2 were employed to react 31.427 g (0.1 mol) of 4,4'-bis(fluoro)triphenylphosphine oxide, 18.621 g (0.1 mol) of 4,4'-dihydroxybiphenyl and 15.203 g (0.11 mol) of potassium carbonate in 200 ml of N-methylpyrrolidone and work up the product as a polymer of the formula IIa, 3 having an inherent viscosity of 0.307.

Preparation of a Phosphonic Ester of the Formula IIa, 9

19.499 g (0.1 mol) of benzenephosphonyl dichloride and 18.621 g (0.1 mol) of 4,4'-dihydroxybiphenyl were introduced into 200 ml of dried 1,2-dichloroethane and cooled down to 10° C. 21.25 g (0.21 mol) of triethylamine were slowly added dropwise and the temperature rose to about 40° C. The pasty reaction mixture was stirred under reflux for 7 hours. After cooling down, the precipitated triethylammonium chloride was filtered off and the clear polymer solution was added dropwise to methanol to precipitate the polymer. The precipitate was filtered off and repeatedly extracted with boiling methanol.

Drying gave a polymer of the formula IIa, 9 having an inherent viscosity of 0.365.

EXAMPLES 1 TO 3

Preparation of Stabilized Polyaryl Ether Ketone Molding Compositions

The polyaryl ether ketone was admixed with 0.5% by weight of each of the polymeric phosphorus compounds as stabilizer, thoroughly mixed and extruded from an extruder with a housing temperature of 400° C. in strand form and granulated.

COMPARATIVE EXPERIMENTS CE1 TO CE3

CE1: The polyaryl ether ketone was extruded without added stabilizer and granulated.
CE2: 0.5% by weight of triphenyl phosphate was added as stabilizer.
CE3: 0.5% by weight of tricresyl phosphate was added as stabilizer.

The respective granules were subjected to a measurement of the melt stability. The measurement took the form of a determination of the melt index (MVI) in accordance with German Standard Specification DIN 53 735-MFI-B at 400° C. under a load of 10 kg using an MP-D instrument from Göttfert. Each sample was subjected to three measurements with a heating-up time of 5, 30 and 60 minutes. The results are summarized in the table.

TABLE

| Example | Stabilizer | MVI [ccm/10 min] 5 min | 30 min | 60 min | Comment |
|---|---|---|---|---|---|
| 1 | IIa, 6 | 70.3 | 66.2 | 59.6 | (1) |
| 2 | IIa, 3 | 87.3 | 82.8 | 74.3 | (1) |
| 3 | IIa, 9 | 60.4 | 52.0 | 46.2 | (1) |
| CE1 | — | 51.8 | 42.8 | 32.1 | — |
| CE2 | Triphenyl phosphate | 73.8 | 65.9 | 45.3 | (2) |
| CE3 | Tricresyl phosphate | 75.3 | 68.9 | 33.7 | (3) |

(1): No noticeable odor during processing
(2): Odor evolution in the course of extrusion, polymer shows slight foaming during MVI measurement
(3): Very intensive odor at the time of extrusion

EXAMPLES 4 TO 8

Preparation of a Stabilized Polyaryl Ether Ketone Molding Composition Using a Phosphorus Compound IIb The polyaryl ether ketone was admixed with 0.5% by weight of each stabilizer, intensively mixed and extruded from an extruder at a housing temperature of 400° C. in strand form and granulated; the rest of the procedure was as described above. The result is shown in the table.

TABLE

| Ex. | Stabilizer | MVI [ccm/10 min] 5 min | 30 min | 60 min | Color | Comments |
|---|---|---|---|---|---|---|
| 4 | IIb, 1 | 83.7 | 88.2 | 65.2 | pale gray | (1) |
| 5 | IIb, 2 | 86.1 | 66.9 | 40.7 | medium brown | (1) |
| 6 | IIb, 3 | 78.8 | 70.6 | 40.1 | pale gray | (1) |
| 7 | IIb, 5 | 84.3 | 73.0 | 50.9 | light brown | (1) |
| 8 | IIb, 6 | 80.6 | 77.0 | 68.6 | light brown | (1) |
| CE1 | — | 51.8 | 42.8 | 32.1 | medium brown | — |
| CE2 | triphenyl phosphate | 73.8 | 65.9 | 45.3 | medium brown | (2) |
| CE3 | tricresyl phosphate | 75.3 | 68.9 | 33.7 | medium brown | (3) |

(1): No noticeable odor during processing
(2): Odor evolution in the course of extrusion, polymer shows slight foaming during MVI measurement
(3): Very intensive odor during processing

We claim:
1. A stabilized polyaryl ether ketone molding composition, containing as essential substituents
A: from 50 to 99.99% by weight of a polyaryl ether ketone A prepared by electrophilic polycondensation and at least 50 mol % of which is made up of units of the formula I

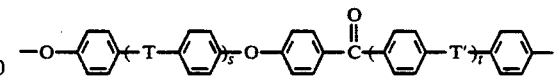

where s and t are each 0, 1, 2 or 3 and T and T' are each —O— or —CO—, or a ring-substituted $C_1$–$C_8$-alkyl, $C_6$–$C_{20}$-aryl or halogen derivative thereof,
B: from 0.01 to 4% by weight of a phosphorus compound B containing units of the general formula IIa

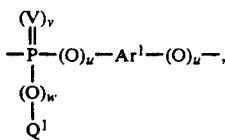

in which the substituents and indices have the following meanings:

V is oxygen or sulfur, $Q^1$ is $C_1$-$C_{25}$-alkyl or aryl of from 6 to 25 carbon atoms in which the aromatic rings can be monosubstituted, disubstituted or trisubstituted by alkyl of from 1 to 4 carbon atoms, $Ar^1$ is meta-phenylene, para-phenylene or from 2 to 6 aromatic rings which are linked together meta- or para via a chemical bond or via oxygen, sulfur, a —CO— group, an —SO$_2$— group or a —C(CH$_3$)$_2$— group, it being possible for each aromatic ring to be monosubstituted, disubstituted or trisubstituted by alkyl of from 1 to 4 carbon atoms, u, v, and w are each 0 or 1, and C: up to 50% by weight of a further thermoplastic which differs from A), D: up to 45% by weight of fibrous or particulate fillers or mixtures thereof.

2. A molding composition as claimed in claim 1, containing component B) in an amount of from 0.1 to 1% by weight.

3. A molding composition as defined in claim 1, wherein component B) has an inherent viscosity greater than 0.1 (measured on 1 g/100 ml in N-methylpyrrolidone at 25° C.).

4. A molding composition as defined in claim 1, containing as and essential constituent of component A a polyaryl ether ketone of the unit Ie

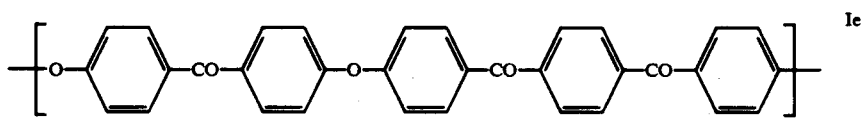

* * * * *

UNITED STATES PATENT AND TRADEMARK OFFICE
CERTIFICATE OF CORRECTION

PATENT NO. : 5,145,894

DATED : September 8, 1992

INVENTOR(S) : KOCH et al.

It is certified that error appears in the above-identified patent and that said Letters Patent is hereby corrected as shown below:

On the Title Page

In the Abstract

Line 6,

"or aryl or from" should read --or aryl of from--

Line 8,

"by slkyl" should read --by alkyl--

Line 26,

Delete "$C_6$-$C_{20}$-aryl,"

UNITED STATES PATENT AND TRADEMARK OFFICE
CERTIFICATE OF CORRECTION

PATENT NO. : 5,145,894
DATED : September 8, 1992
INVENTOR(S) : KOCH et al.

It is certified that error appears in the above-identified patent and that said Letters Patent is hereby corrected as shown below:

Line 32,

"form" should read --from--

In the Claims

Claim 1, Column 10, Line 67

"of the general formula" should read --of the formula--

Signed and Sealed this

Thirty-first Day of August, 1993

Attest:

BRUCE LEHMAN

Attesting Officer    Commissioner of Patents and Trademarks